United States Patent
Ventimeglia et al.

(10) Patent No.: US 9,198,437 B2
(45) Date of Patent: Dec. 1, 2015

(54) PIZZA PAN

(71) Applicants: Jamie Joseph Ventimeglia, Macomb, MI (US); Thomas Joseph Ventimeglia, Macomb, MI (US); Joel Michael Ventimeglia, Macomb, MI (US)

(72) Inventors: Jamie Joseph Ventimeglia, Macomb, MI (US); Thomas Joseph Ventimeglia, Macomb, MI (US); Joel Michael Ventimeglia, Macomb, MI (US)

( * ) Notice: Subject to any disclaimer, the term of this patent is extended or adjusted under 35 U.S.C. 154(b) by 234 days.

(21) Appl. No.: 13/949,141

(22) Filed: Jul. 23, 2013

(65) Prior Publication Data

US 2014/0020570 A1 Jan. 23, 2014

Related U.S. Application Data

(60) Provisional application No. 61/674,787, filed on Jul. 23, 2012.

(51) Int. Cl.
| | |
|---|---|
| *A47J 43/18* | (2006.01) |
| *A21B 3/13* | (2006.01) |
| *B28B 7/02* | (2006.01) |
| *A47J 43/20* | (2006.01) |

(52) U.S. Cl.
CPC . *A21B 3/132* (2013.01); *A21B 3/13* (2013.01); *A47J 43/20* (2013.01); *B28B 7/02* (2013.01)

(58) Field of Classification Search
CPC ........... A21B 3/13; A21B 3/15; A47J 36/022; A47J 36/027; A47J 43/20; B28B 7/02
USPC ................... 99/426, 432, 433, 428, DIG. 15; 249/155, 157, 160, 164, 163; 220/573.1, 912; D7/354, 550.1, 554.3
See application file for complete search history.

(56) References Cited

U.S. PATENT DOCUMENTS

| | | | | |
|---|---|---|---|---|
| 3,115,104 | A * | 12/1963 | Enoch et al. | 426/275 |
| 4,563,946 | A * | 1/1986 | Barlow et al. | 99/450 |
| 4,773,320 | A * | 9/1988 | Stock et al. | 99/449 |
| RE33,447 | E * | 11/1990 | Rosman | 220/4.21 |
| D338,595 | S * | 8/1993 | Cafarella et al. | D7/551.1 |
| 5,234,334 | A * | 8/1993 | Bamonte | 425/403 |
| 5,752,432 | A * | 5/1998 | Burchfield | 99/426 |

* cited by examiner

*Primary Examiner* — Reginald L Alexander

(57) ABSTRACT

A pizza pan allows a user, with a single pan, to make a square pizza and a round pizza. Typically, the square pizza will abut against the round pizza at a middle of the round pizza, resulting in a half-round pizza which can be sliced into standard wedge-shaped round pizza slices. The square pizza pan portion can be sized to be about ½ the size of a conventional square pizza pan, for example. This way, instead of a whole round or a whole square pizza, a user can get a half round and a half square pizza in the same order. One embodiment of the pizza pan can be used to create a deep dish half square, half round pizza while another embodiment of the pizza pan can be used to create a half square deep dish pizza and a traditional, half-round pizza.

8 Claims, 6 Drawing Sheets

PIZZA PAN

CROSS-REFERENCE TO RELATED APPLICATION

This application claims the benefit of priority of U.S. provisional application No. 61/674,787, filed Jul. 23, 2012, the contents of which are herein incorporated by reference.

BACKGROUND OF THE INVENTION

The present invention relates to pizza pan and, more particularly, to a half square, half round, connected pizza pan to be used for commercial and residential use.

People, whether they are eating in a restaurant, ordering a pizza from a pizzeria, or making their own pizza at home, are often undecided on whether they want a square or round pizza. Currently, the only options available to these people is to order one of each (round and square), or, on some occasions, there may be an option to order a specialty pizza, such as a heart shaped pizza. However, there is currently no option available for a person to order a pizza that is part round pizza and part square pizza.

As can be seen, there is a need for pizza pan that is capable of making a part round and part square pizza in the same pan.

SUMMARY OF THE INVENTION

In one aspect of the present invention, a combination pizza pan comprises a semicircular pizza base; a rectangular pizza base attached along one edge thereof to a flat edge of the semicircular pizza base; and raised sides surrounding at least three sides defining an outer periphery of the rectangular pizza base.

In another aspect of the present invention, a combination deep dish half square, traditional half round pizza pan comprises a semicircular pizza base; a rectangular pizza base attached along one edge thereof to a flat edge of the semicircular pizza base; and raised sides surrounding all four sides of the rectangular pizza base, wherein the raised sides include a shared raised side disposed along the flat edge of the semicircular pizza base.

In a further aspect of the present invention, a combination deep dish half round, half square pizza pan comprises a semicircular pizza base; a rectangular pizza base attached along one edge thereof to a flat edge of the semicircular pizza base; and raised sides surrounding at least three sides defining an outer periphery of the rectangular pizza base, wherein the semicircular pizza base is continuous with the rectangular pizza base and the raised sides are disposed about a combined outer periphery of the semicircular pizza base and the rectangular pizza base.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a pizza pan that can, in a single pan, allow a user to make a square pizza and a round pizza. Typically, the square pizza will abut against the round pizza at a middle of the round pizza, resulting in a half-round pizza which can be sliced into standard wedge-shaped round pizza slices. The square pizza pan portion can be sized to be about ½ the size of a conventional square pizza pan, for example. This way, instead of a whole round or a whole square pizza, a user can get a half round and a half square pizza in the same order. One embodiment of the pizza pan can be used to create a deep dish half square, half round pizza while another embodiment of the pizza pan can be used to create a half square deep dish pizza and a traditional, half-round pizza.

Figure 1:
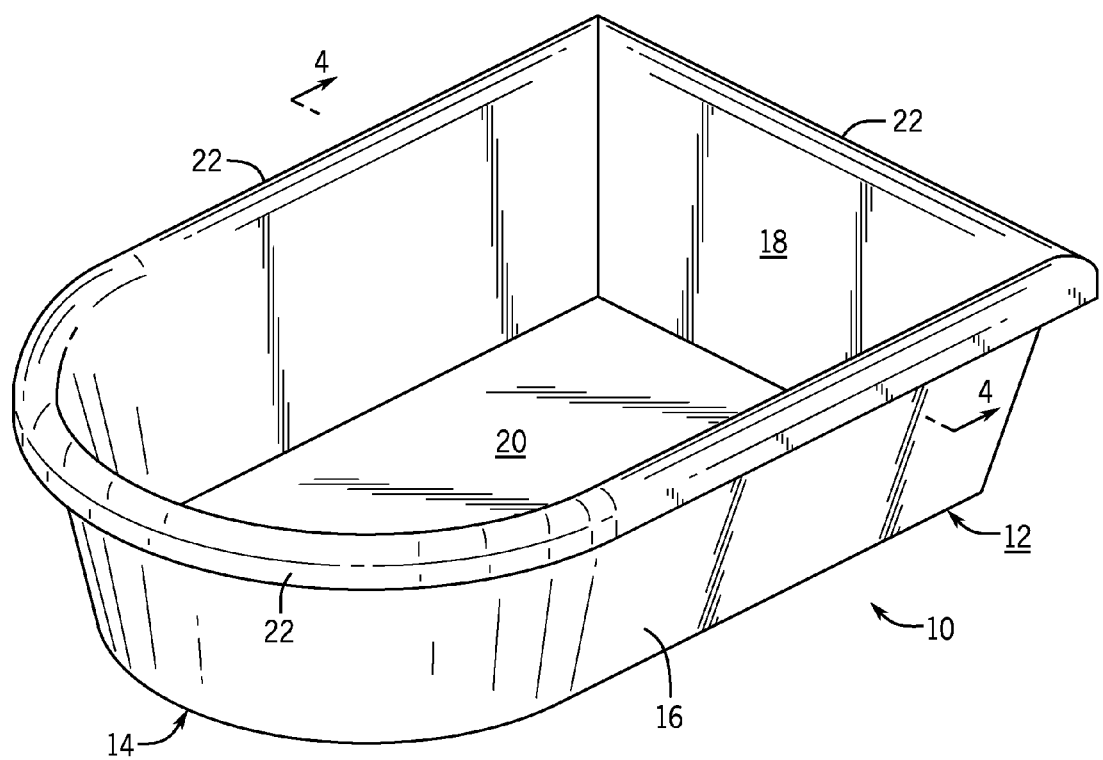
FIG. 1 is a perspective view of a deep dish half-round, half-square pizza pan according to an exemplary embodiment of the present invention.
Figure 2:
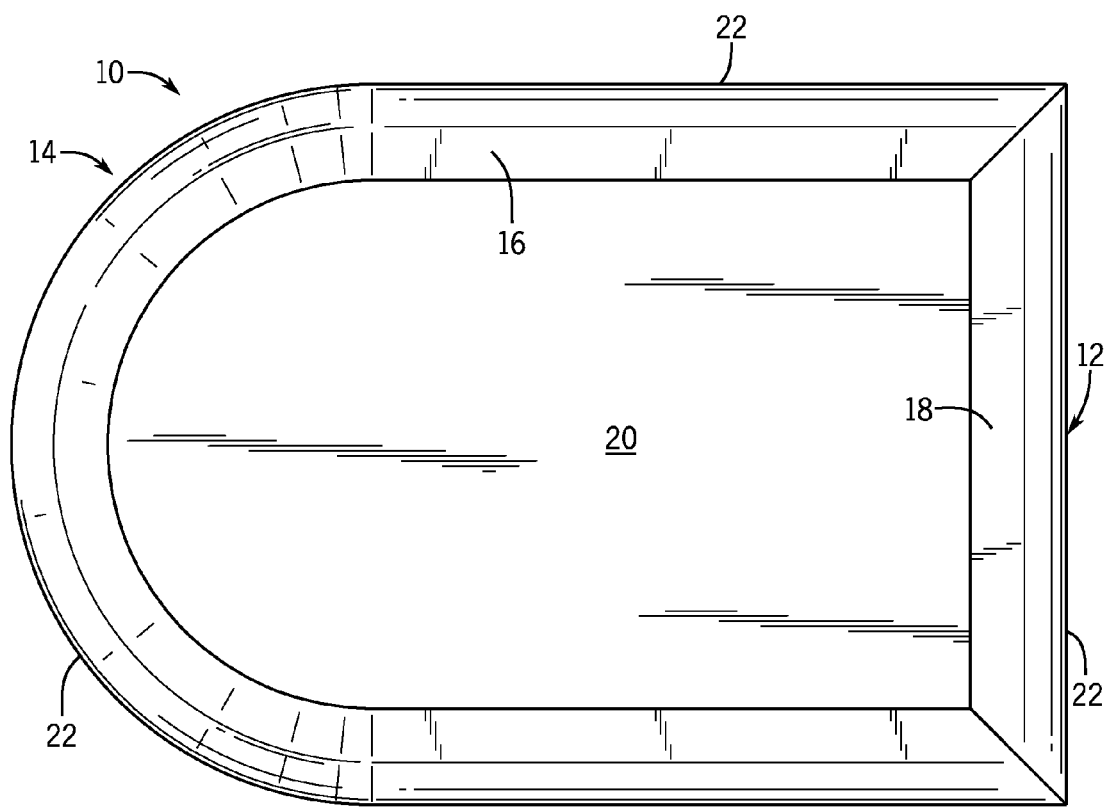
FIG. 2 is a top view of the deep dish half-round, half-square pizza pan of FIG. 1.
Figure 3:
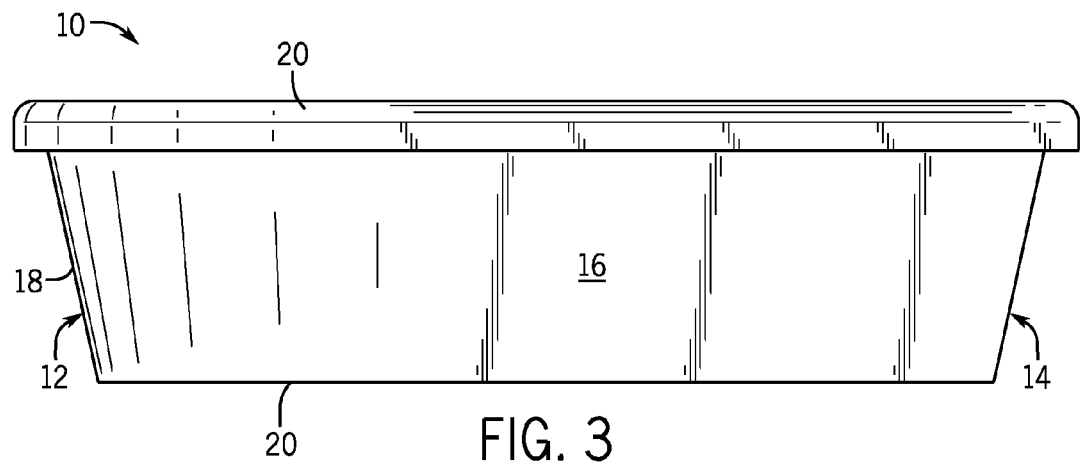
FIG. 3 is a side view of the deep dish half-round, half-square pizza pan of FIG. 1.
Figure 4:
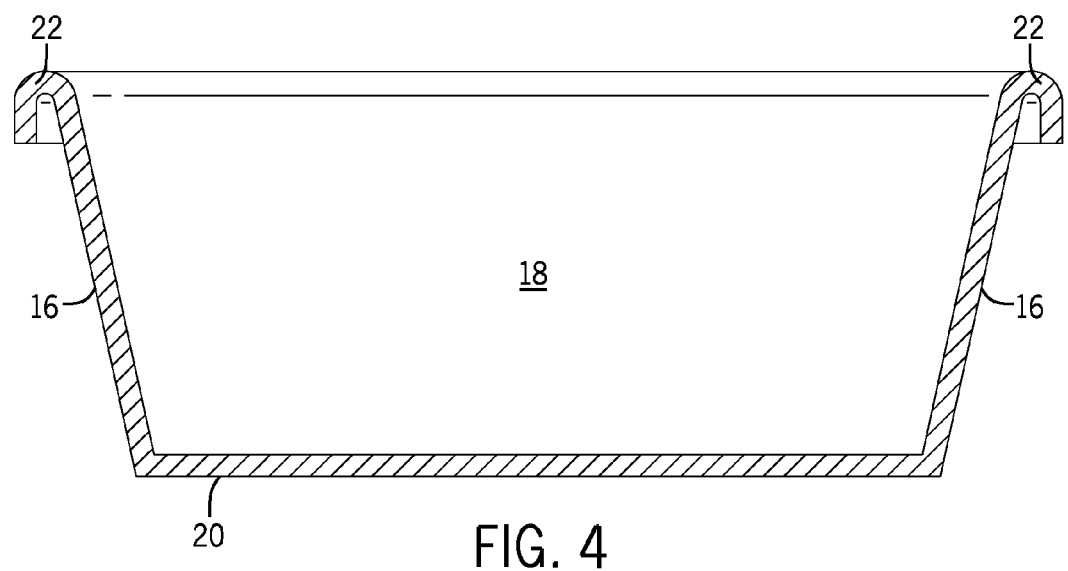
FIG. 4 is a cross-sectional view taken along line 4-4 of FIG. 1.

Referring to FIGS. 1 through 4, a combination deep dish pizza pan 10 (also referred to as deep dish pizza pan 10 or simply, pizza pan 10) is shown with a solid bottom 20. The bottom 20 can span continuously between a "square" pan portion 12 and a "round" pan portion 14 of the pizza pan 10. While the terms square and round are used herein, it should be noted that round refers to the pizza style, and that, with the pan of the present invention, the "round" pizza is really a semi-circular pizza. Similarly, while the term "square" is used, the square pizza of the present invention may be better described as rectangular, as the length of adjacent sides does not have to be the same.

The square pizza pan portion 12 can have a square side wall 18 extending from the bottom of the pizza pan 10 at the end of the square pizza pan portion 12. Continuous side walls 16 can run from the square side wall 18 and curve to form a semicircular wall of the round pan portion 14 of the pizza pan 10. In some embodiments of the present invention, a divider can be inserted inside the pizza pan 10 to separate the square pan portion 12 from the round pan portion 14. This may be useful, for example, if different toppings are desired on each pizza.

The deep dish pizza pan 10 can include a hem flange top edge 22 to help provide stability to the pan as well as provide ease in handling of the pan.

Figure 5:
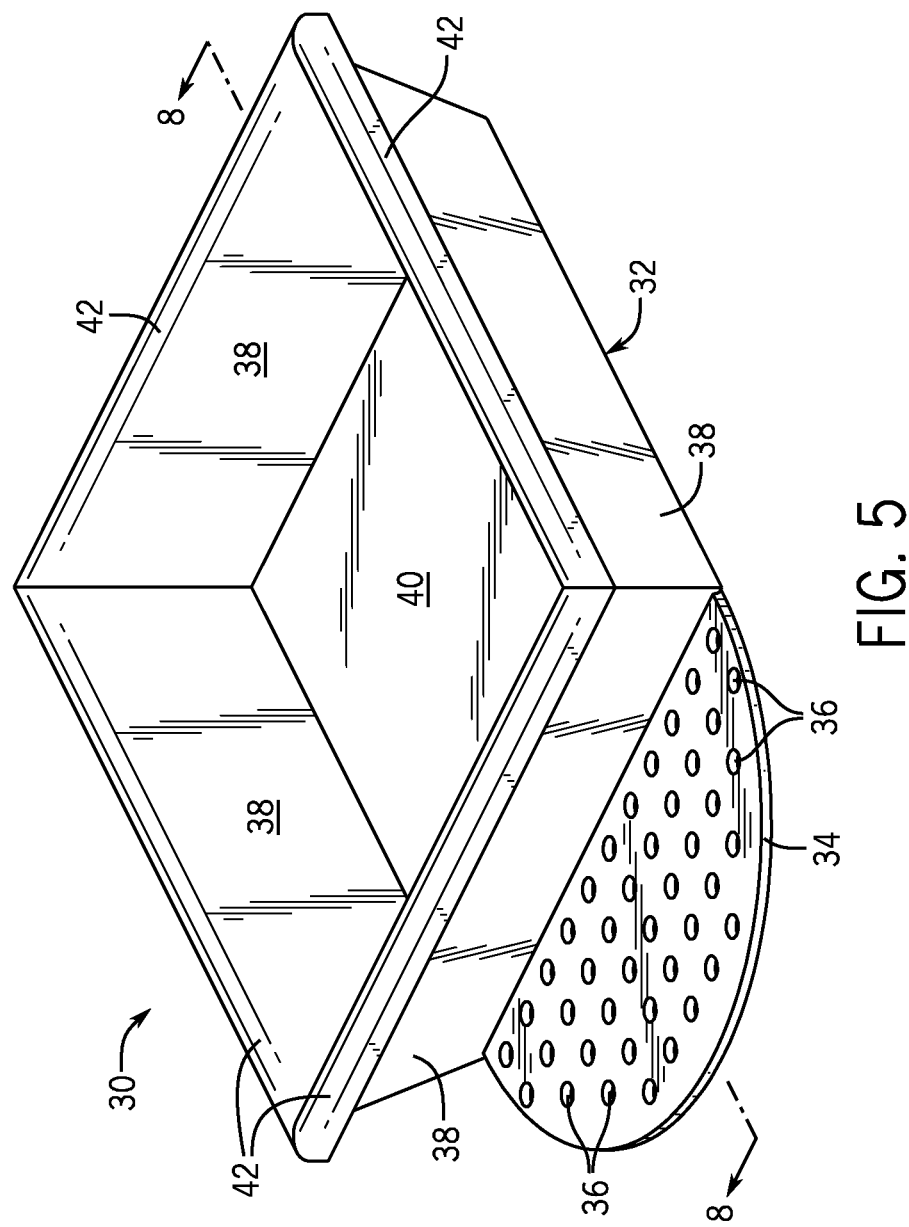
FIG. 5 is a perspective view of a deep dish half-square, traditional half round pizza pan according to an exemplary embodiment of the present invention.
Figure 6:
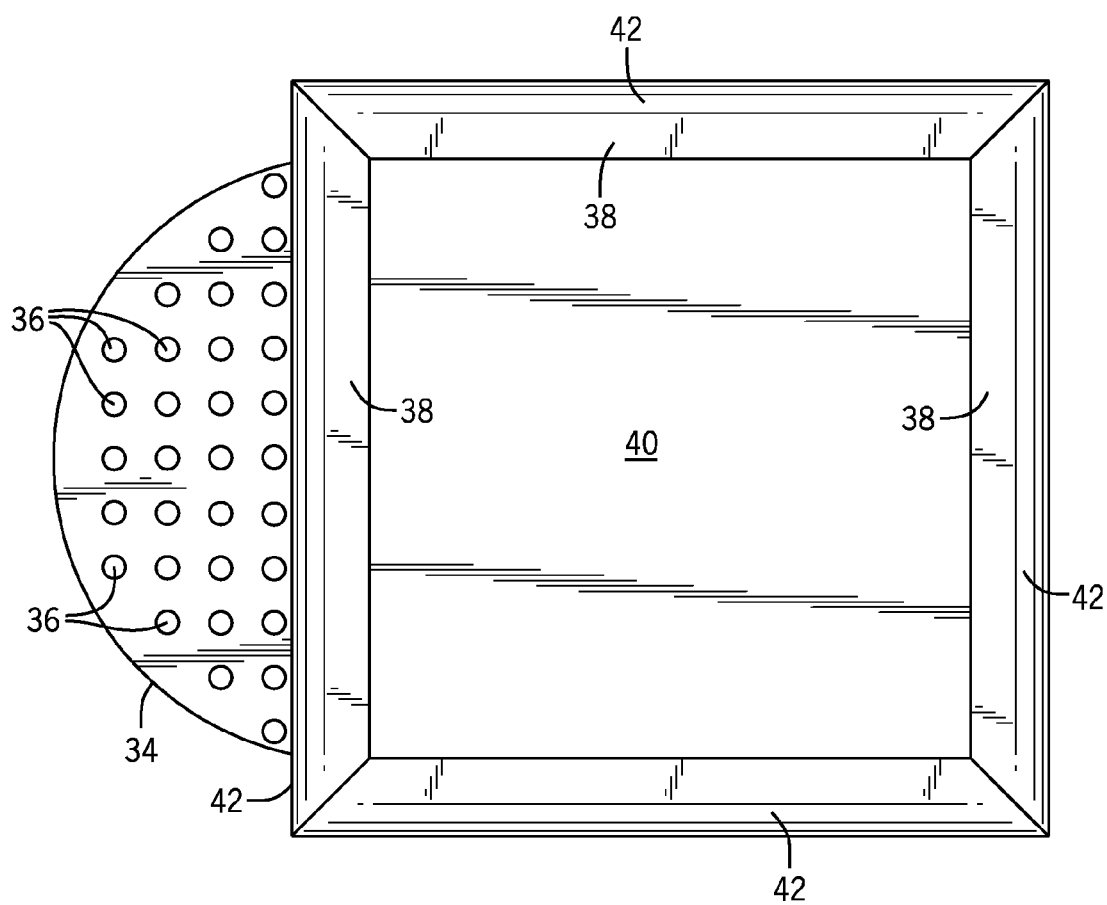
FIG. 6 is a top view of the deep dish half-square, traditional half round pizza pan of FIG. 5.
Figure 7:
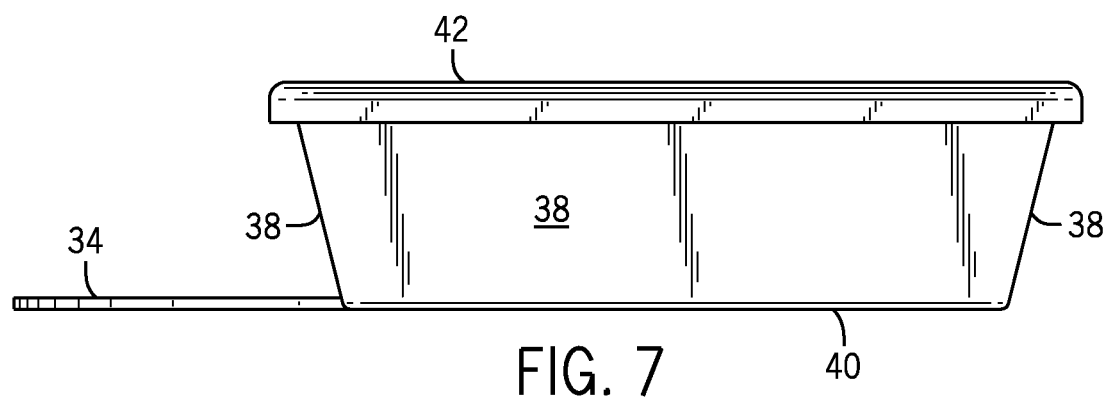
FIG. 7 is a side view of the deep dish half-square, traditional half round pizza pan of FIG. 5.
Figure 8:
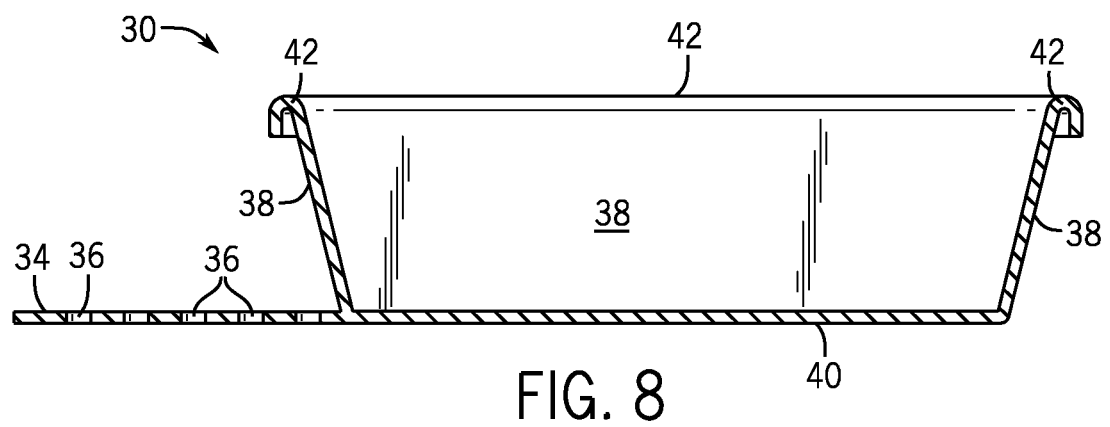
FIG. 8 is a cross-sectional view taken along line 8-8 of FIG. 5.

As shown in FIGS. 5 through 8, a combination pizza pan 30 according to another embodiment of the present invention can include a square pan portion 32 having a bottom portion 40 and side walls 38 to form a deep dish square pizza pan. Similar to the deep dish pizza pan 10 described above, the pizza pan 30 can include a hem flange top edge 42 disposed continuously about the top edge of the side walls 38.

A round pan portion 34 can be attached to one of the side walls 38 of the pizza pan 30 and extend therefrom to form a half-round pizza base. In some embodiments, as shown in the Figures, the bottom of the round pan portion 34 can include perforations 36 disposed in the bottom thereof. In other embodiments, the bottom of the round pan portion 34 can be a solid member for baking a round pizza portion thereupon. In some embodiments, the side wall 38 that interconnects the square pan portion 32 from the round pan portion 36 can be removable, allowing the user to lay out a single piece of dough to form both sides at once, for example.

While FIGS. 5 through 8 show the perforations 36 limited to the round pan side 34, in some embodiments, the bottom 40 of both sides of pizza pan 30 or Various pan sizes are contemplated within the scope of the present invention. The sizes of the pizza pan can be, for example, 5-inch square and 5-inch round, 6-inch square and 6-inch round, 7-inch square and 7-inch round, 8-inch square and 8-inch round, and 9-inch square and 9-inch round, for example.

The pizza pan can be made from various materials suitable for use in baking pizza. For example, heavy duty 14 gauge, 0.063 inch thick aluminum can be used for the base and sides of the round and square pans. The perforations can be made in various shapes and styles as well. The pans can be made as a single, unitary piece, or may be made by fusing together a half-round pan with a half-square pan.

The combination pizza pan of the present invention can satisfy the hunger for both a round and a square slice without having to order more pizza than one desires, such as ordering a whole round and a whole square pizza.

It should be understood, of course, that the foregoing relates to exemplary embodiments of the invention and that modifications may be made without departing from the spirit and scope of the invention as set forth in the following claims.

What is claimed is:

1. A combination pizza pan comprising:
   a semicircular pizza base;
   a rectangular pizza base attached along one edge thereof to a flat edge of the semicircular pizza base; and
   raised sides surrounding all four sides of the rectangular pizza base.

2. The combination pizza pan of claim 1, wherein the raised sides include a shared raised side disposed along the flat edge of the semicircular pizza base, and wherein the shared raised side is removable.

3. The combination pizza pan of claim 1, further comprising perforation disposed in the semicircular pizza pan.

4. The combination pizza pan of claim 1, wherein the semicircular pizza base is continuous with the rectangular pizza base.

5. The combination pizza pan of claim 1, wherein the raised sides includes a hem flange top edge.

6. The combination pizza pan of claim 1, wherein at least one raised side is removable.

7. A combination pizza pan comprising:
   a semicircular pizza base;
   a rectangular pizza base attached along one edge thereof to a flat edge of the semicircular pizza base; and
   raised sides surrounding at least three sides defining an outer periphery of the rectangular pizza base,
   wherein the semicircular pizza base is continuous with the rectangular pizza base and the raised sides are disposed about a combined outer periphery of the semicircular pizza base and the rectangular pizza base, and
   wherein at least one raised side is removable.

8. The combination pizza pan of claim 7, wherein the raised sides includes a hem flange top edge.

\* \* \* \* \*